No. 768,652. PATENTED AUG. 30, 1904.
G. H. CHANDLER.
NON-REFILLABLE BOTTLE.
APPLICATION FILED AUG. 27, 1903.
NO MODEL.
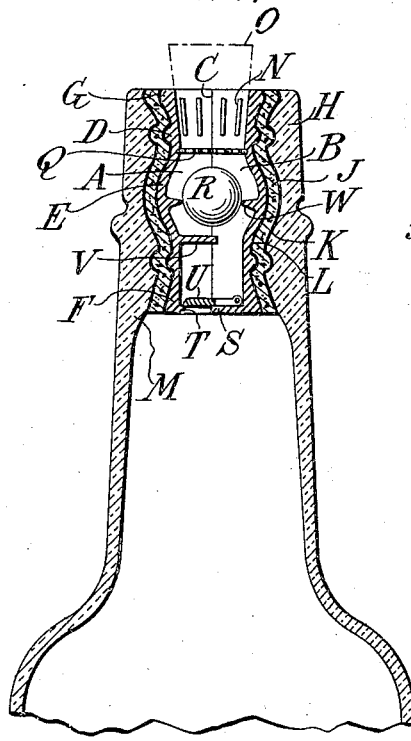
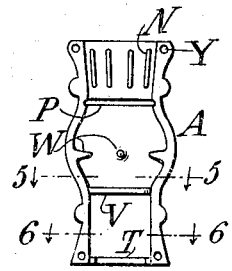
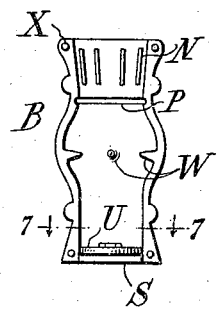
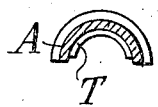
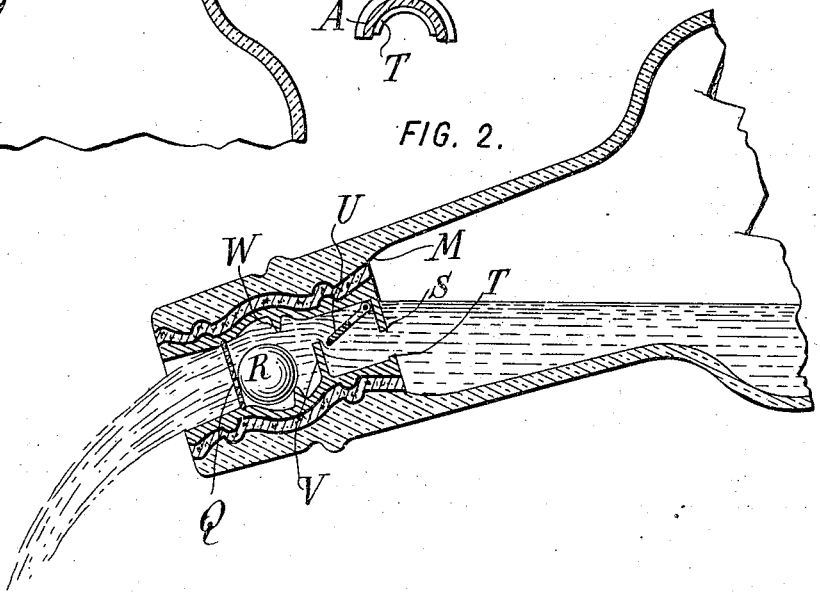
WITNESSES:
René Bruine
Theodore T. Snell
INVENTOR:
George H. Chandler
By Attorneys,
Arthur G. Fraser & Co.

No. 768,652.

Patented August 30, 1904.

UNITED STATES PATENT OFFICE.

GEORGE H. CHANDLER, OF NEW YORK, N. Y., ASSIGNOR OF ONE-THIRD TO MARY LA MONTE, OF NEW YORK, N. Y.

NON-REFILLABLE BOTTLE.

SPECIFICATION forming part of Letters Patent No. 768,652, dated August 30, 1904.

Application filed August 27, 1903. Serial No. 170,951. (No model.)

*To all whom it may concern:*

Be it known that I, GEORGE H. CHANDLER, a citizen of the United States, residing in the borough of Brooklyn, county of Kings, city and State of New York, have invented certain new and useful Improvements in Non-Refillable Bottles, of which the following is a specification.

My invention aims to provide various improvements in bottles which are adapted to permit the pouring out of the contents and to prevent refilling.

The improvements are designed especially to provide a simple mechanism which permits a free outflow, but automatically and tightly checks returning liquid, and which is very simple and cheap to construct.

My invention provides various other improvements referred to in detail hereinafter.

Referring to the accompanying drawings, illustrating an embodiment of the invention, Figure 1 is a diametral section of a bottle in an upright position. Fig. 2 is a similar section of a bottle in a position to pour out liquid. Figs. 3 and 4 are views of the two separate parts in which the mechanism and its shell are formed, the views being taken on diametral planes at right angles to those of Figs. 1 and 2. Fig. 5 is a section on the line 5 5 of Fig. 3. Fig. 6 is a section on the line 6 6 of Fig. 3. Fig. 7 is a section on the line 7 7 of Fig. 4.

Referring to the accompanying drawings, the mechanism is all within a casing which is preferably of metal and formed in two cast halves A and B, the division being along the longitudinal line C, Fig. 1. This casing is provided on the outside with projecting portions, such as one or more ribs D, a bulging central portion E, and also bulging end portions F and G. These projections serve to hold the mechanism-casing in place in the following manner: The upper end H of the bottle-neck is of any usual or suitable shape on the outside and is formed on the inside with recesses, such as the grooves or depressions shown, and coinciding or coöperating with the projecting portions of the casing A B. A thin-walled cylinder of cork J is steamed until it is quite soft and is then inserted into the neck of the bottle. Then the two parts of the casing A and B are placed together in proper position and forced, by means of a heavy pressure, into the inside of the cork cylinder, which latter is so soft that it is pressed out into the deep grooves and depressions of the bottle-neck by the corresponding projections of the casing. When the cork dries and stiffens, it is practically impossible to withdraw the casing, and it is impossible also to steam the cork, as only its ends are accessible. The same construction holds the two parts of the casing firmly together. Additional security may be provided, if desired, by introducing a suitable cement or glue on either or both sides of the cork cylinder, as indicated by heavy lines at K and L. The special head tapers off into the neck of the bottle, as shown at M, making a very strong and easily-molded construction.

The interior wall of the casing at its upper end is slightly flared and may be provided with ribs N to engage and hold the cork O, which is preferably used to prevent the escape of the contents in transportation. It is to be noted, however, that the bottle when upright is always closed by the valve hereinafter referred to.

Below the space in which the cork lies the two halves of the casing are provided with registering grooves P P', which when the two halves are brought together embrace the edges of a screen Q, Figs. 1 and 2. This screen holds in place a ball R just below it and also prevents tampering with this ball, while the ball, in conjunction with the screen, makes it almost impossible to tamper with the mechanism below the ball.

Within the lower end of the casing is a valve-seat, preferably formed of a diaphragm S, extending somewhat more than half-way across the half-casing B, and a rib T, formed on the lower edge of the half-casing A. A valve U of the shape shown in plan in Fig. 7 is pivoted on the diaphragm S and fits the sides of the casing with a slight amount of play, so that it may swing open to the position of Fig. 2 to permit the discharge of the liquid. When it is attempted to introduce liquid into the bottle, however, the valve is closed by the inward pressure of the liquid, and the greater the pressure the more firmly it is held against its seat and the more tight the closure. On the opposite half A of the casing I provide also a diaphragm V, which preferably extends slightly beyond the center line, as shown in Fig. 5, and which lies slightly beyond the edge of the valve when open, as shown in Fig. 2. This diaphragm serves the double purpose of preventing access to the valve and of directing liquid which is forced inward behind the open valve U, so as to press it quickly to its seat. This action is so quick that it is impossible to get more than a few drops of liquid into the bottle by inverting it and forcing the liquid upward. The casing is preferably provided also with any suitable number of inward projections W, four being shown, which serve to hold the ball R off the diaphragm V.

Obviously the interlocking feature of the bottle-head and the mechanism-casing might be obtained by various other specific shapes than those shown and by the use of other materials than cork, though I prefer the latter, because of its extreme softness when steamed as compared with its subsequent stiffness. Almost any elastic material, however, would serve, since it is impossible to get a good purchase so as to exert a force pulling the casing out as strong as that which can be obtained to force it in. Obviously, also, whether the material be cork or other elastic material, it serves just as well to hold the two halves of the casing together. The casing may be made in more than two longitudinal separated parts, if desired, though two is most convenient, as will be apparent. The cork or similar material between the casing and the bottle-head should be thin, and the lower part of the casing should be at least as small as and preferably a little smaller than the upper part to permit its ready insertion. The entire mechanism can be very cheaply made and is certain in operation and durable.

The two halves of the casing may be accurately positioned relatively to each other by any suitable means—such, for example, as the pins X, Fig. 4, on the member B, which project into registering holes Y on the member A.

Though I have described with great particularity of detail a device embodying the invention, yet it is to be understood that the invention is not limited to the specific form disclosed. Various modifications thereof in detail and in the arrangement and combination of the parts may be made by those skilled in the art without departure from the invention.

What I claim is—

1. A non-refillable bottle including in combination a casing formed in longitudinally-separate parts with registering grooves P P', and a screen Q embraced and held in position by said grooves.

2. A non-refillable bottle including in combination a casing formed in longitudinally-separate parts, a diaphragm formed in one of said parts extending partly across said casing so as to leave a passage therethrough, a valve pivoted at the rear of said diaphragm adapted to close said passage and to swing up to an oblique position limited by the side of the casing, and a second partial diaphragm formed in an opposite part of the casing above said valve and in position to deflect liquid forced into the casing to the rear of said valve to close the same quickly.

3. A non-refillable bottle including in combination a casing formed in longitudinaly-separate parts, a diaphragm formed in one of said parts extending partly across said casing so as to leave a passage therethrough, a valve pivoted at the rear of said diaphragm adapted to close said passage and to swing up to an oblique position limited by the side of the casing, a second partial diaphragm formed in an opposite part of the casing above said valve and in position to deflect liquid forced into the casing to the rear of said valve to close the same quickly, prongs projecting inward above said second diaphragm, a ball supported thereon centrally above and out of contact with said second diaphragm, and a screen extending across the casing above said ball.

4. A non-refillable bottle including in combination a substantially semicylindrical member A formed with a diaphragm V on its inside and with projecting ribs on its outside, and a similar member B formed with a diaphragm S carrying a pivoted valve U on its inside and with projecting ribs on its outside.

In witness whereof I have hereunto signed my name in the presence of two subscribing witnesses.

GEORGE H. CHANDLER.

Witnesses:
 DOMINGO A. USINA,
 THEODORE T. SNELL.